United States Patent
Kerner et al.

(10) Patent No.: US 10,245,915 B2
(45) Date of Patent: Apr. 2, 2019

(54) TASK-SPECIFIC RIDE-HEIGHT AND SPEED CONTROL OF AN AGRICULTURAL PRODUCT APPLICATOR WITH AIR STRUT SUSPENSION

(71) Applicant: CNH Industrial America LLC, New Holland, PA (US)

(72) Inventors: Richard Kerner, Sunbug, MN (US); Richard A. Moen, Glenwood, MN (US); William A. Roach, Lake Lillian, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/474,419

(22) Filed: Mar. 30, 2017

(65) Prior Publication Data

US 2018/0281549 A1 Oct. 4, 2018

(51) Int. Cl.
*B60G 17/0195* (2006.01)
*A01B 63/00* (2006.01)
*G05D 1/02* (2006.01)
*A01M 7/00* (2006.01)
*G05D 1/00* (2006.01)
*A01M 21/04* (2006.01)

(52) U.S. Cl.
CPC ........ *B60G 17/0195* (2013.01); *A01B 63/002* (2013.01); *A01M 7/0089* (2013.01); *A01M 21/043* (2013.01); *G05D 1/0011* (2013.01); *G05D 1/021* (2013.01); *G05D 2201/0201* (2013.01)

(58) Field of Classification Search
CPC ............. B60G 17/0195; A01B 63/002; A01M 7/0089; A01M 21/043; B60W 10/04; B60W 10/22; B60W 30/143; B60W 2300/154; B60W 2520/10; B60W 2530/10; B60W 2710/22; B60W 2720/10; G05D 1/0011; G05D 1/021; G05D 2201/0201
See application file for complete search history.

(56) References Cited

U.S. PATENT DOCUMENTS 4,697,797 A 10/1987 Gold
4,911,416 A 3/1990 Warmuth, II
(Continued)

FOREIGN PATENT DOCUMENTS

CN 103749417 A 4/2014
WO 03053724 A1 7/2003
WO 2010020607 A1 2/2010

*Primary Examiner* — Charles J Han
(74) *Attorney, Agent, or Firm* — Rebecca L. Henkel; Rickard K. DeMille (57) ABSTRACT

A system, apparatus and method for providing task-specific ride-height and speed control in a self-propelled agricultural product applicator utilize a controllable ride-height trailing arm suspension system, including an extensible air strut and an angular position sensor, for independently joining each wheel to a frame of the applicator. An electronic control unit utilizes the angular positions detected by the sensors, in conjunction with a desired task input, to control the air struts in a manner providing a ride-height corresponding to the desired task input. The electronic control unit also controls maximum speed of the applicator for each task, per a predetermined schedule, or in response to a suspended load of the applicator.

20 Claims, 7 Drawing Sheets

(56) References Cited

U.S. PATENT DOCUMENTS

| | | | |
|---|---|---|---|
| 6,036,201 A | 3/2000 | Pond et al. | |
| 6,966,502 B2 * | 11/2005 | Wilt | A01M 7/0014 239/160 |
| 8,113,521 B2 | 2/2012 | Lin et al. | |
| 8,333,390 B2 | 12/2012 | Linsmeier et al. | |
| 8,641,051 B2 | 2/2014 | Pavuk et al. | |
| 8,827,292 B2 | 9/2014 | Batsch et al. | |
| 8,991,841 B2 | 3/2015 | Holden et al. | |
| 2003/0218374 A1 | 11/2003 | Kress | |
| 2012/0153590 A1 | 6/2012 | Gilbert | |
| 2015/0352921 A1 | 12/2015 | Dames | |
| 2016/0081264 A1 | 3/2016 | Tollefsrud et al. | |
| 2017/0006760 A1 * | 1/2017 | Nielsen | A01D 34/661 |

\* cited by examiner

TASK-SPECIFIC RIDE-HEIGHT AND SPEED CONTROL OF AN AGRICULTURAL PRODUCT APPLICATOR WITH AIR STRUT SUSPENSION

FIELD OF THE INVENTION

This invention relates generally to self-propelled agricultural product application implements, such as a high-clearance sprayer and/or spreader, and more particularly to a suspension system for such implements.

BACKGROUND OF THE INVENTION

Modern agricultural practices rely heavily on precise and timely applications of fertilizers, herbicides, pesticides and other chemicals. In situations where the applications must be made to standing row crops, such as corn or beans, liquid or granular materials are often applied using a high ground clearance, self-propelled applicator.

In order to provide maximum ground clearance, such applicators utilize highly specialized suspension systems for connecting the ground engaging wheels of the applicator to a frame of the applicator. Typically, separate hydraulic drive motors are provided as part of the suspension, for each drive wheel, to thereby further enhance ground clearance by minimizing the encroachment of drive line or typical suspension components into the space between the wheels under the applicator.

In the past, suspension systems for high ground clearance, self-propelled applicators utilized suspension components, including compression springs and hydraulic shock absorbers, that were essentially the same as those used in automotive and commercial vehicle suspensions. While these components have generally worked well in the specialized suspension systems of high ground clearance, self-propelled applicators, they are not ideal and further improvement is desirable.

One problem with prior high clearance applicator suspension systems, is that the ground clearance tends to vary depending upon how heavily the applicator is loaded. Initially, as it pulls away from a tender with a full load, an applicator is typically carrying several thousand pounds of a product to be applied. As the product is dispensed onto the field by the applicator, the weight of the remaining product being carried by the applicator gradually decreases to zero. With prior suspensions that rely on compression springs for supporting the load carried by the applicator, ground clearance starts out at a minimum when the applicator is initially fully loaded, with the springs compressed to their lowest working height. As product is dispensed and load on the applicator decreases, the compression springs extend from their initially compressed state, and raise the applicator higher above the ground surface.

Having ground clearance vary is undesirable for at least two reasons. First, the effectiveness of the product being applied is highly dependent upon precise application. As ground clearance changes, spray or granular spreading patterns may be adversely affected, requiring continual compensating adjustments to be made by an operator of the applicator, in order to maintain optimal product application. Second, ride quality and handling characteristics of the applicator are typically affected by ground clearance, and the state of extension of the compression springs. The springs, and hence the suspension, is considerably stiffer when the springs are more fully compressed than when they are extended.

Prior suspension systems using compression springs are also typically optimized for one type of operating mode. This results in compromising suspension performance its other operating modes that are typically necessary in practical utilization of the applicator. For example, it is necessary to drive the applicator across the field in an unloaded state, to and from the tender, in addition to driving the vehicle across the field in a fully or partially loaded state while applying product to the field. It will likely be necessary for the applicator to travel on public roads, at times, in moving between fields. Differences in handling characteristics inherent in spring-based suspension systems, from loaded to unloaded states of the applicator, may make such on-road transit more difficult. It may be necessary to transport the applicator on a truck or trailer between fields. This can present additional problems for high ground clearance applicators, in that the overall combined height of the applicator and the bed of the trailer or vehicle carrying the applicator may exceed applicable limits for transport on public roads.

It is desirable, therefore, to provide an improved suspension system for self-propelled, high ground clearance, agricultural product applicators. It is particularly desirable to provide such an improved suspension system that can set and maintain a desired ground clearance, and provide desirable ride and handling characteristics in a self-propelled, high ground clearance, agricultural product applicator throughout a wide range of operating modes and conditions.

SUMMARY OF THE INVENTION

The invention provides a system, apparatus and method for providing task-specific ride-height and speed control in a self-propelled agricultural product applicator. The invention utilizes a controllable ride-height trailing arm suspension system, including an extensible air strut and an angular position sensor, for independently joining each wheel to a frame of the applicator. An electronic control unit utilizes the angular positions detected by the sensors, in conjunction with a desired task input, to control the air struts in a manner providing a ride-height corresponding to the desired task, input. The electronic control unit also controls maximum speed of the applicator for each task, per as predetermined schedule, or, in some forms of the invention, in response to a suspended load of the applicator.

In one form of the invention, a task-specific ride-height and speed control system is provided for a self-propelled agricultural product applicator having a propulsion unit and three or more ground engaging wheels operatively joined to a frame adapted for supporting at least one agricultural product container and distributor arrangement. The frame defines forward and rear ends of the frame, a longitudinally extending central axis of the frame extending from the rear to the front of the frame in a direction of navel of the applicator, and a vertical axis of the frame.

The task-specific ride-height and speed control system utilizes controllable ride-height trailing arm suspension systems, for independently joining each wheel to the frame, and also includes an air power source, a speed control arrangement, and an electronic control unit.

Each trailing arm suspension system may include an upper suspension arm, a lower suspension arm an extensible air strut and an angular position sensor. The suspension arms, air strut and position sensor of the suspension system for each wheel are operatively interconnected to one another, and located between a rolling axis the ground engaging wheel independently supported by that suspension system and a point of attachment of the suspension system to the frame, such that the angular position sensor detects a relative angular position between the upper and lower suspension arms at a present extension of the air strut.

The air power source provides a controlled flow of pressurized air to the air strut of each of the suspension systems, to thereby control ride-height by controlling extension of each of the air struts. The speed control arrangement is operatively connected to the propulsion unit for controlling ground speed of the applicator. The electronic control unit is operatively connected to the angular position sensors, the load sensing arrangement, the air power source, and the speed control arrangement.

The electronic control unit may be configured for receiving a desired task input, and signals from the angular position sensors indicative of a present relative angular position of the upper and lower suspension arms of each suspension system. The control unit may also be configured for commanding the air power source to control the air struts at an extension of the struts that provides a ride-height corresponding to the desired task input. The electronic control unit may be further configured for determining a maximum ground speed corresponding to the desired task input, and commanding the speed control arrangement to limit ground speeds while operating at the ride-height corresponding to the desired task input to ground speeds less than or equal to the maximum ground speed corresponding to the desired task input.

In some forms of a task-specific ride-height speed control system, according to the invention, the desired task input may indicate a selected desired task of one or more predetermined desired tasks, and the electronic control unit may be configured to control the air struts at an extension thereof providing a ride-height corresponding to the selected desired task input.

Some forms of a task-specific ride-height and speed control system, according to the invention, further include a load sensing arrangement operatively connected to the electronic control unit for detecting a suspended weight of the applicator and agricultural product in the product container, and for sending a signal indicative of the detected suspended weight to the electronic control unit. The term "suspended weight" is equivalent to the term "sprung weight" and is intended to include all weight supported by the suspension systems of the applicator. This weight, generally speaking, includes the weight of everything carried by the frame of the applicator, as supported by the suspension systems. In forms of the invention having a load sensing arrangement, the electronic control unit may be further configured to modify the determined maximum ground speed in accordance with a predetermined schedule of maximum ground speeds, as a function of the desired task input, ride-height, and the determined suspended weight.

In some forms of a task-specific ride-height and speed control system according to the invention, the load sensing arrangement may include a pressure sensor operatively connected to detect a pressure of the flow of air provided by the air power source to the air struts, as being indicative of the suspended weight of the applicator and product container and distributor.

The electronic control unit, in some forms of a task-specific ride height speed control system. According to the invention, may be yet further configured to compare the present ride-height signals from the angular position sensors to the detected suspended weight, and to command the speed control arrangement to further limit the propulsion unit to operation at speeds at or under a predetermined default speed if the detected suspended weight and any one or more of the present ride-height signals is not consistent with a ride-height corresponding to the desired task input.

An electronic controller in a task-specific ride-height and speed control system, according to the invention, may also be configured to control the speed of the propulsion unit in accordance with at least one of the predetermined combinations of desired task input, ride-height, determined suspended weight and maximum ground speed from the group of predetermined combinations consisting of: (1) the desired task input is TRANSIT, present ride-height is as commanded for TRANSIT operation, detected suspended weight indicates that an unloaded product container and distributor are mounted on the frame, and a commanded maximum TRANSIT ground speed of the applicator; (2) the desired task input is TRANSIT, present ride-height is as commanded for TRANSIT operation, detected suspended weight indicates that no product container and distributor are mounted on the frame, and a commanded maximum bare frame ground speed of the applicator that is lower than the maximum TRANSIT ground speed; (3) the desired task input is APPLICATION, present ride-height is as commanded for APPLICATION operation, detected suspended weight indicates that a product container and distributor are mounted on the frame and carrying a load of product within load limits of the applicator, and a commanded maximum APPLICATION ground speed of the applicator; (4) the desired task input is APPLICATION, present ride-height is as commanded for APPLICATION operation, detected suspended weight indicates that a product container and distributor are mounted on the frame and carrying a load of product that exceeds load limits of the applicator, and a commanded maximum OVERLOADED ground speed of the applicator; (5) the desired task input is TENDERING, present ride-height is as commanded for TENDERING operation, detected suspended weight indicates that a product container and distributor are mounted on the frame and carrying a load of product within load limits of the applicator, and a commanded maximum TENDERING ground speed of the applicator; and, and PARKED, wherein the air struts of the suspension systems are locked against movement at a present ride-height, i.e. at whatever ride-height the applicator was operating at when the operator of the applicator entered the PARKED desired task mode.

In some forms of a task-specific ride-height and speed control system, according to the invention, the electronic control unit may be configured to receive a suspended weight signal from the load sensor arrangement and recalculate the maximum ground speed whenever the desired task input is changed. The electronic control unit may also be configured to command a change in maximum speed to the recalculated maximum ground speed only after the applicator has first been brought to a complete stop.

The invention may also take the form of a self-propelled agricultural product applicator, incorporating a task-specific ride-height and speed control system, according to the invention. Such an applicator may include a propulsion unit and three or more ground engaging wheels operatively joined to a frame adapted for supporting at least one agricultural product container and distributor arrangement. The frame defines forward and rear ends of the frame, a longitudinally extending central axis of the frame extending from the rear to the front of the frame in a direction of travel of the applicator, and a vertical axis of the frame.

The invention may also take the form of a method for providing task-specific ride-height and speed control for a self-propelled agricultural product applicator having a propulsion unit and three or more ground engaging wheels operatively joined to a frame adapted for supporting at least one agricultural product container and distributor arrangement and defining forward and rear ends of the frame, a longitudinally extending central axis of the frame extending from the rear to the front of the frame in a direction of travel of the applicator, and a vertical axis of the frame.

A method for providing task-specific ride-height and speed control according to the invention may include the steps of: (1) independently joining each wheel to the frame with a controllable ride-height trailing arm suspension system, with each trailing arm suspension system including an upper suspension arm, a lower suspension arm, an extensible air strut and an angular position sensor operatively interconnected to one another and disposed between a rolling axis the ground engaging wheel independently supported by that suspension system and a point of attachment of the suspension system to the frame such that the angular position sensor detects a relative angular position between the upper and lower suspension arms at a present extension of the air strut; (2) providing a controlled flow of pressurized air from an air power source to the air strut of each of the suspension systems, to thereby control ride-height by controlling extension of each of the air struts; (3) providing a speed control arrangement operatively connected to the propulsion unit for controlling ground speed of the applicator; (4) operatively connecting an electronic control unit to the angular position sensors, the air power source and the speed control arrangement; (5) receiving, a desired task input and signals from the angular position sensors, at the electronic control unit, the signals from the angular position sensor being indicative of a present relative angular position of the upper and lower suspension arms of each suspension system; (6) utilizing the electronic control unit for commanding the air power source to control the air struts at an extension thereof providing a ride-height corresponding to the desired task input; and, (7) utilizing the electronic control unit for determining a maximum ground speed corresponding to the desired task input, and commanding the speed control arrangement to limit ground speeds while operating at the ride-height corresponding to the desired task input to ground speeds less than or equal to the maximum ground speed corresponding to the desired task input.

A method for providing task-specific ride-height and speed control according to the invention may further include, operatively connecting a load sensor arrangement to the electronic control unit for detecting a suspended weight of the applicator and agricultural product in the product container, and for sending a signal indicative of the detected suspended weight to the electronic control unit, and using the electronic control unit to modify the determined maximum ground speed in accordance with a predetermined schedule of maximum ground speeds as a function of the desired task input, ride-height, and the detected suspended weight. A method may further include, performing the step of receiving a suspended weight signal from the load sensor arrangement and recalculating the maximum ground speed whenever the desired task input is changed. A method, according to the invention may further include, performing the step of commanding a change in maximum speed, from a previously commanded maximum ground speed to the recalculated maximum ground speed, only after the applicator has first been brought to a complete stop.

In a method, according to the invention, the desired task input may indicate a selected desired task of one or more predetermined desired tasks, and the electronic control unit may be configured to control the air struts at an extension thereof providing a ride-height corresponding to the selected desired task input. In some forms of a method, according to the invention, the one or more predetermined desired tasks may include a product APPLICATION task corresponding to a standard ride-height for applying the agricultural product, and a t least one additional desired task input corresponding to an additional ride height. The at least one additional desired task input and its corresponding ride-height may be selected from the group of desired task inputs and corresponding ride-heights consisting of: TENDERING, at a maximum ride-height of the applicator; TRANSPORT, at a minimum ride-height of the applicator: SERVICING, at a servicing ride-height of the applicator; and PARKED, wherein the suspension systems are locked against movement at a present ride-height when the applicator enters the PARKED task mode.

Other aspects, objects and advantages of the invention will be apparent from the following detailed description and accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE EXEMPLARY EMBODIMENTS

Figure 1:
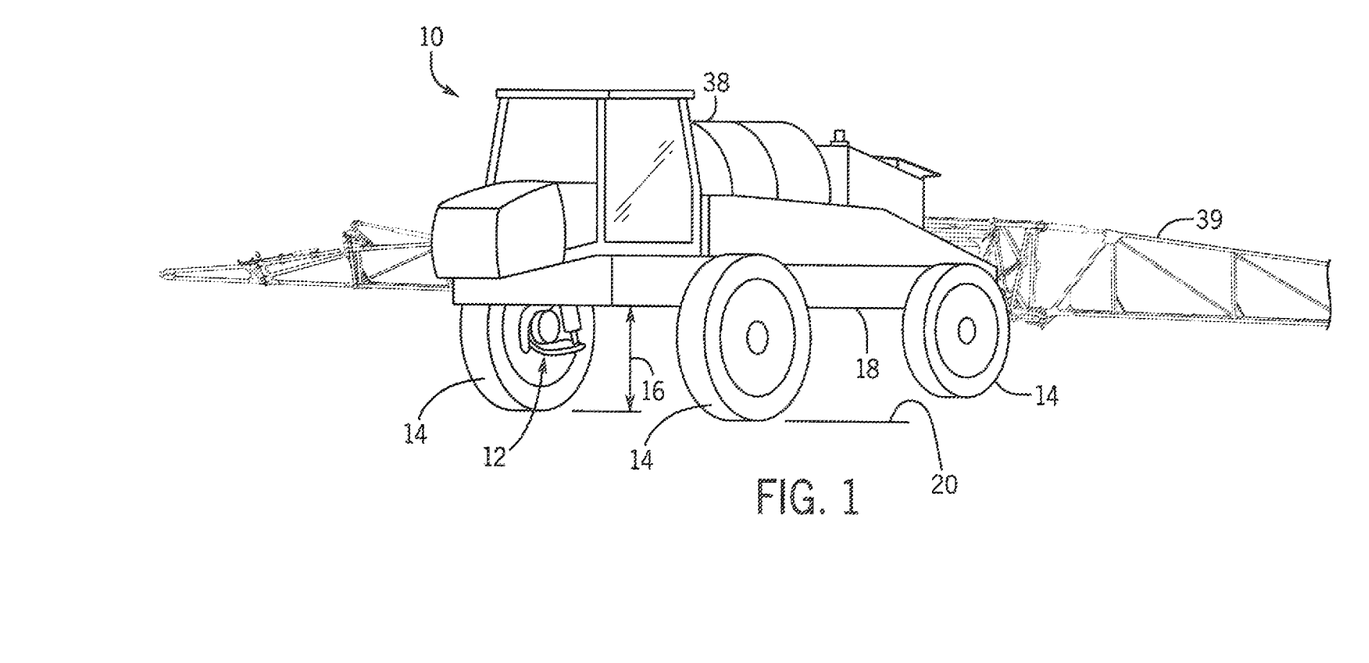
FIG. 1 is an isometric illustration of an exemplary embodiment of a self-propelled, high ground clearance, agricultural applicator, according to the invention.
Figure 2:
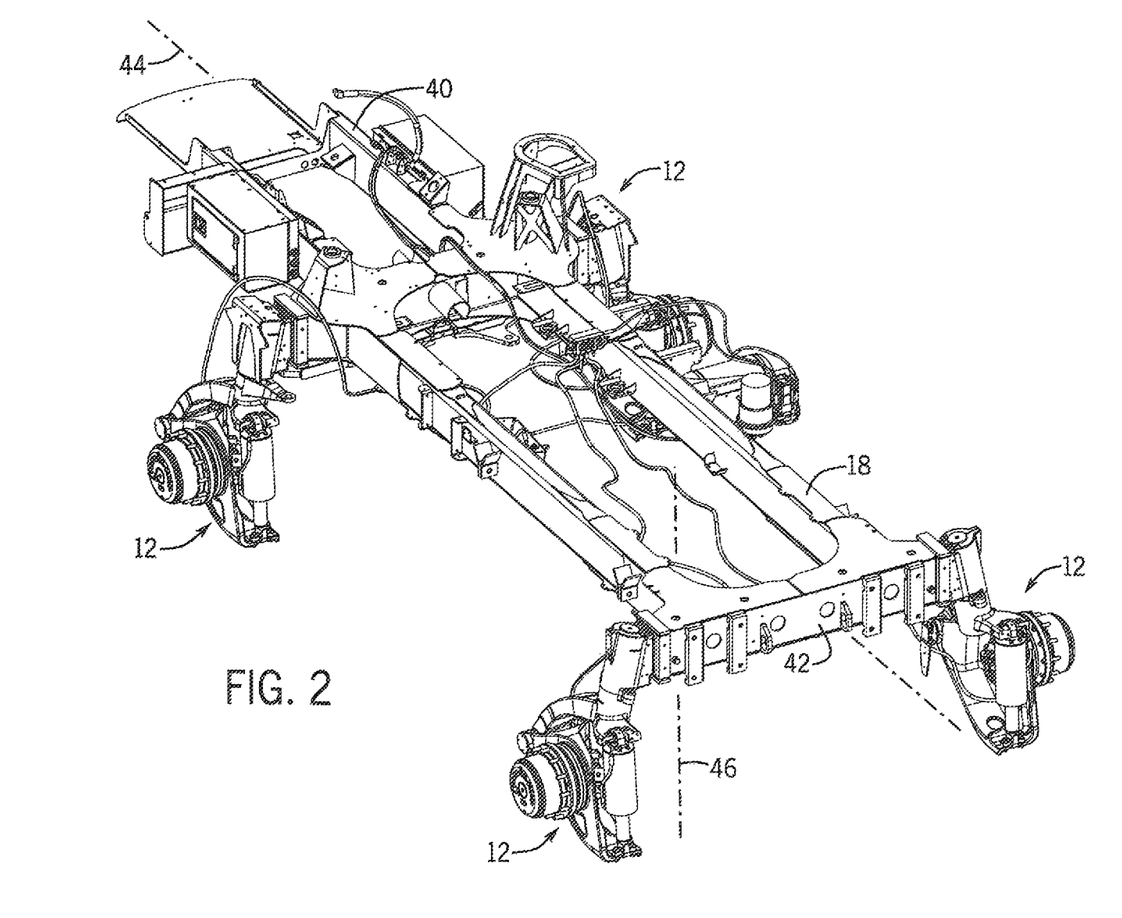
FIG. 2 is an isometric illustration of a frame and suspension systems of the exemplary embodiment of the applicator of FIG. 1.

FIG. 1 shows an exemplary embodiment of the invention in the form of a high ground clearance, self-propelled, agricultural product applicator 10, that includes improved suspension systems 12, according to the invention, for each of the four ground engaging wheels 14 of the applicator 10.

As shown in FIGS. 1-4, and described in more detail below, the invention provides a system, apparatus and method for controlling the height 16 of a frame 18 of a self-propelled agricultural product applicator 10 above a ground surface 20, by using a trailing link suspension system 12 that has an extensible air strut 22, for connecting each of the four ground engaging wheels 14 of the applicator 10 to the frame 18 of the applicator 10. The trailing arm suspension systems 12 each include an upper suspension arm 24 attached to the frame 18, and a lower suspension arm 26 that provides sole support of a ground engaging wheel 14 attached to the lower arm 26, in a manner described in more detail below.

Figure 4:
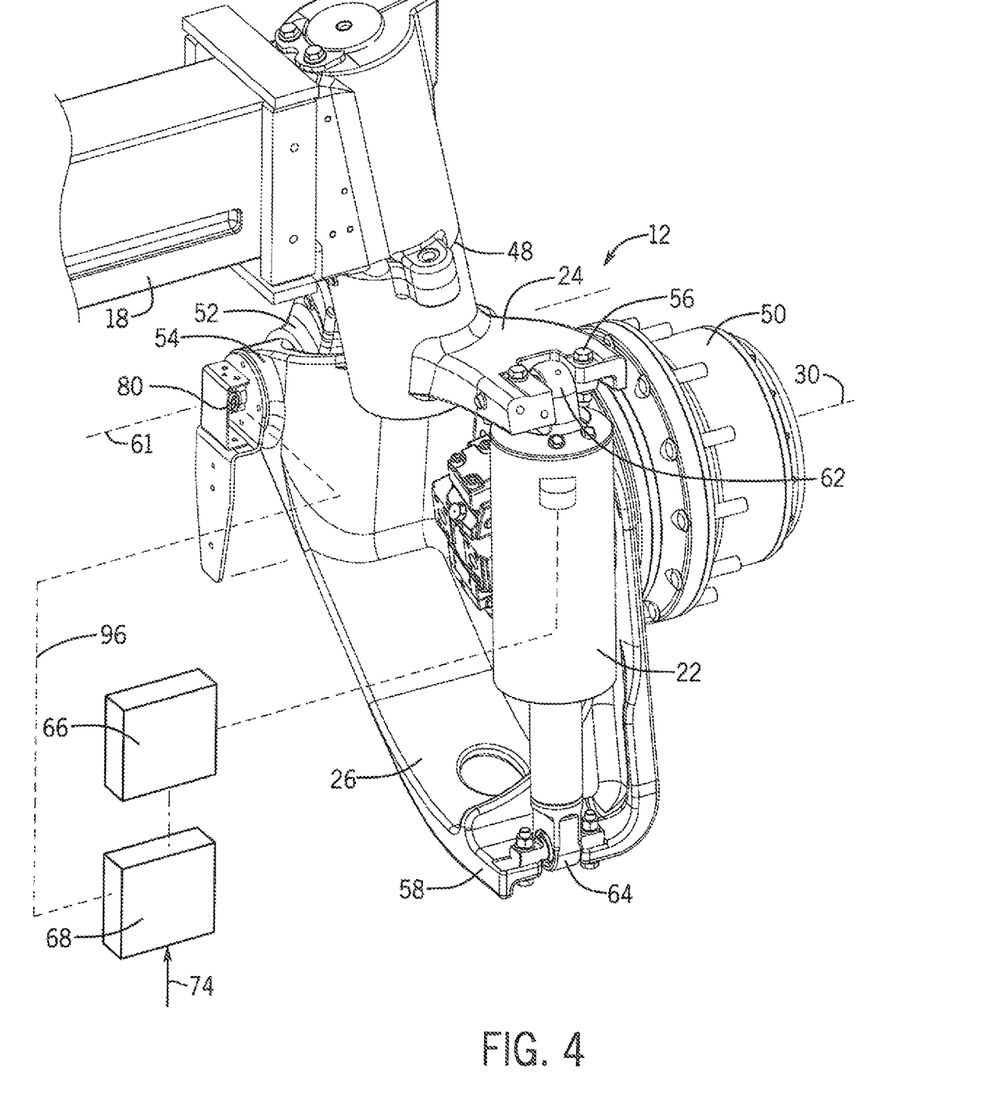
FIG. 4 is an assembled isometric illustration of the suspension system shown in FIG. 3.
Figure 5:
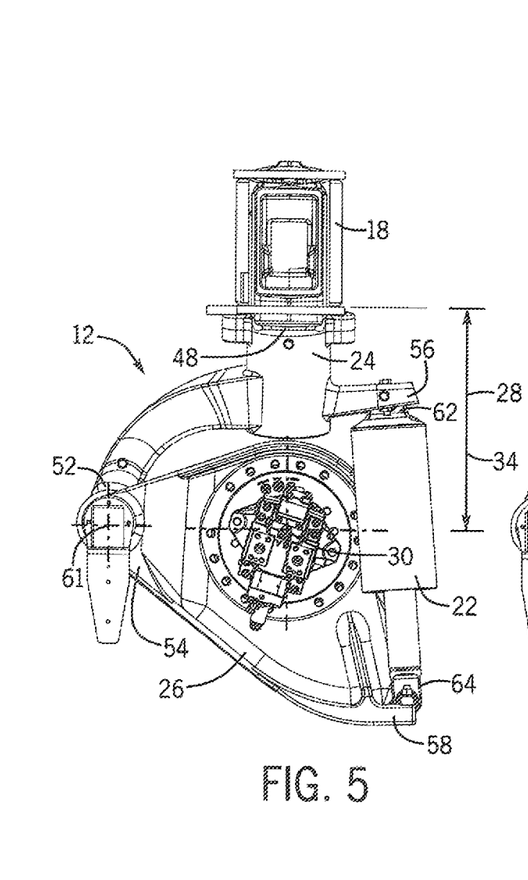
FIGS. 5-7 are orthographic illustrations of the suspension system of FIG. 4, showing the suspension system respectively in maximum height, working height, and minimum height positions.
Figure 6:
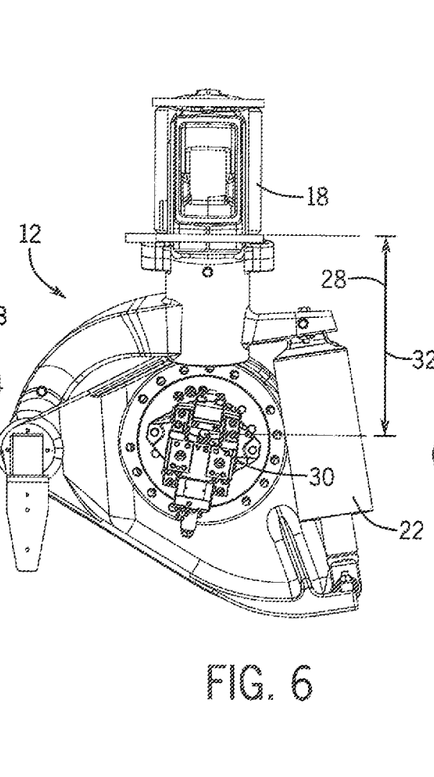
Figure 7:
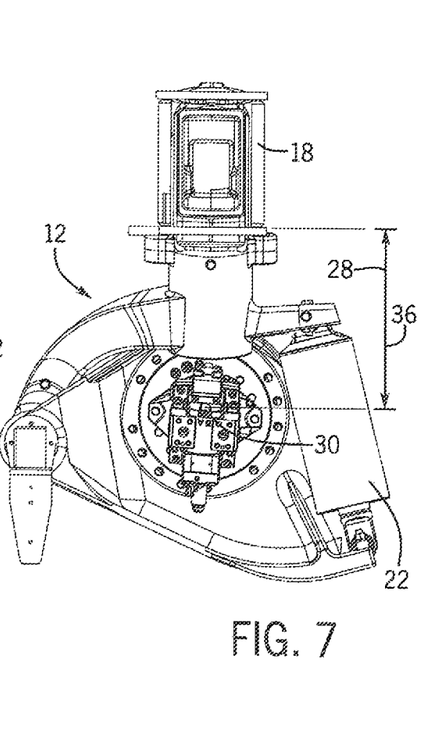

As illustrated in FIGS. 4-7, the extensible air strut 22 is interconnected between the upper and lower arms 24,26 in such a manner that the height 16 of the applicator 10 above the ground surface 20 may be controlled by regulating a flow of pressurized air to the air strut 22, to thereby control extension of the air strut 22 and a vertical distance 28 between a rolling axis 30 of the wheel 14 and the frame 18 of the applicator 10. As shown in FIGS. 5-7, by controlling the flow of pressurized air to the strut 22, the suspension can be positioned and held at desired working height position 32, as shown in FIG. 6, or any other height position between a highest position 34, shown in FIG. 5, and a lowest height position 36, as shown in FIG. 7. Specifically, to raise the applicator frame 18 to a maximum height 16 above the ground surface 20, a flow of pressurized air is supplied the air strut 22 that is sufficient to cause the air strut 22 to extend to its maximum length 34, as illustrated in FIG. 5. To lower the applicator frame 18 to its minimum height 16 above the ground surface 20, pressurized air is allowed to flow out of the air strut 22, so that the air strut 22 can retract to its minimum length 36, as shown in FIG. 7. By regulating the flow of pressurized air to the air strut 22, the suspension 12 can adjust the length of the air strut 22, and hold the frame 18 of the applicator at any desired working height 16 by holding extension of the air strut 22 at a corresponding length within the operative stroke length of the air strut 22.

Returning to FIGS. 1 and 2, the frame 18 of the applicator 10 is adapted for supporting at least one product container 38 and defines forward and rear ends 40,42 of the frame 18, a longitudinally extending central axis 44 of the frame extending from the rear end 42 to the front end 40 of the frame 18, in a direction of travel of the applicator 10, and a vertical axis 46 of the frame 18.

Figure 3:
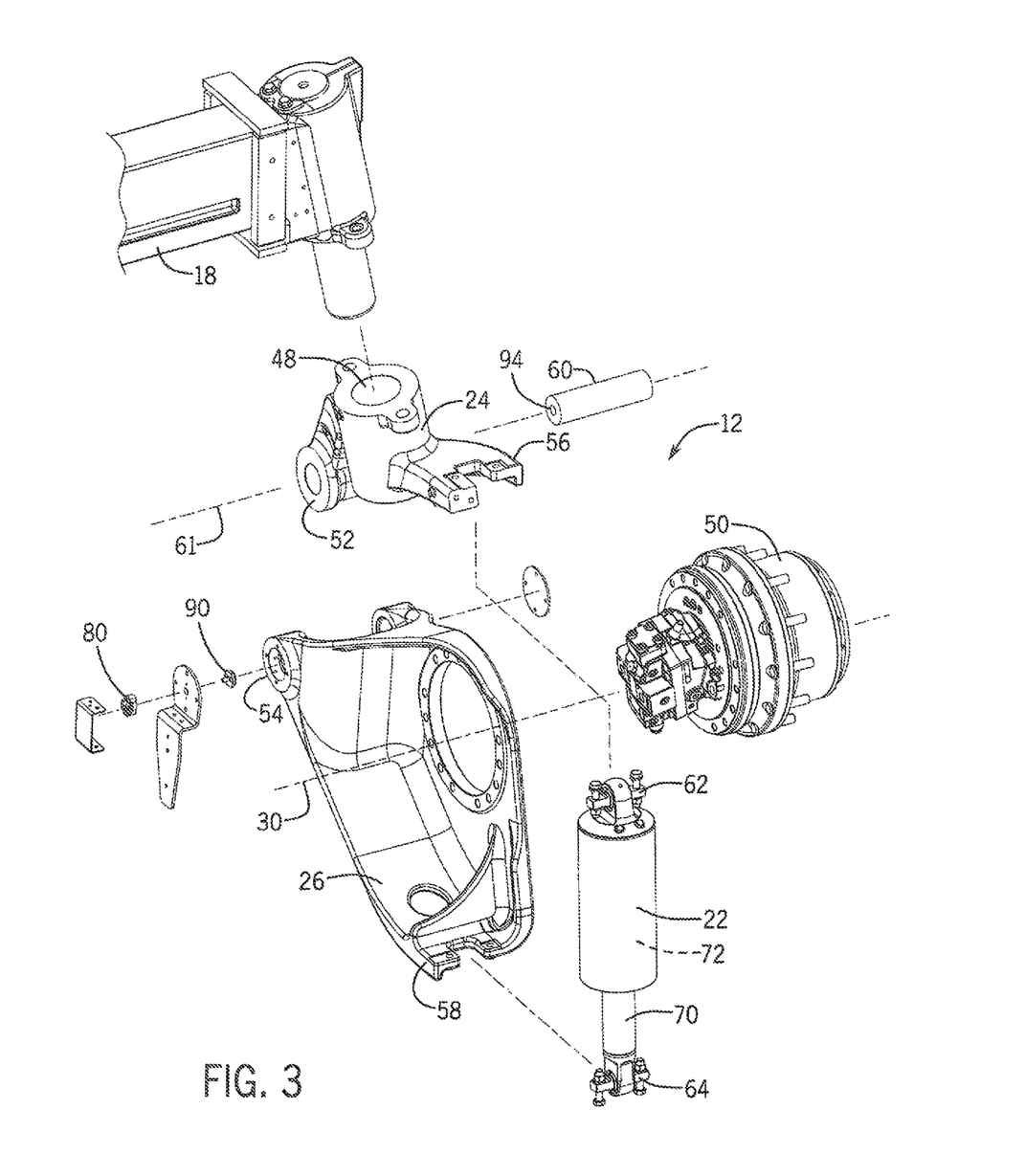
FIG. 3 is an exploded isometric illustration of a suspension system of the exemplary embodiment of the applicator shown in FIG. 1.

FIGS. 3 and 4, illustrate the manner in which the lower suspension arm 26, the upper suspension arm 24, and the air strut 22, of the suspension system 12, are operatively interconnected to one another and disposed between the rolling axis 30 of the ground engaging wheel 14 and the frame 18, for supporting the applicator 10 above the ground surface 20.

The upper suspension arm 24 defines a frame attachment point 48 of the upper suspension arm 24, that is adapted for attachment to the frame 18. FIGS. 3 and 4 illustrate the suspension system 12 for the right rear wheel 12 of the applicator 10. In the exemplary embodiment of the applicator 10, the rear wheels 12 are not steerable, so the attachment points 48 of the rear suspension systems 12 are fixedly attached in a non-rotatable manner to the frame 18. Because the front wheels of the exemplary embodiment of the applicator 10 are steerable, the frame attachment points 48 for the front suspension systems 12 are attached to the frame in a manner that allows the upper suspension anus 22 of the front wheels to pivot about generally vertically extending steering axes (not shown) with respect to the frame 18, as part of a steering mechanism (not shown) of the applicator 10.

The lower suspension arm 26 defines the rolling axis 30 of the ground engaging wheel 12 and is adapted for supportive attachment, to the lower suspension arm 26, of the ground engaging wheel 12, for rotation of the ground engaging wheel 12 about the rolling axis 30 of the wheel 12. In the exemplary embodiment of the applicator 10, each of the four wheels of the applicator 12 is independently powered by a hydraulic motor unit 50 that is mounted on, and solely supported by the lower arm 26 of the suspension, for driving the wheel 12 about the rolling axis 30.

As further illustrated in FIGS. 3-5, the upper and lower suspension arms 24, 26 also each define respective forward 52,54 and aft 56,58 ends of the suspension arms 24,26. The forward ends 52,54 of the upper and lower suspension arms 24,26 are joined to one another by a knee pin 60, best seen in FIG. 3, to form a pivoting connection, that allows for pivoting movement of the lower arm 26 with respect to the upper arm 24 about a suspension pivot axis 61 that extends generally parallel to the rolling axis 30 of the wheel 12 and is located forward of the rolling axis 30 of the wheel 12. The aft ends 56,58 of the upper and lower suspension arms 24,26 are located respectively aft of the frame attachment point 48 and rolling axis 30, and are respectively adapted for connection to upper and lower ends 62,64 of the air strut 22.

As shown schematically in FIG. 4, each of the air struts 22 in the suspension systems of the exemplary embodiment of the applicator 10 is configured for receiving a flow of pressurized air from an air power source 66, and for extending and retracting in response to the flow of pressurized air, to thereby respectively lower and raise the rolling axis 30 of the wheel 12 with respect to the frame attachment point 48, in the manner described above in relation to FIGS. 5-7.

The air struts 22 of the exemplary embodiments are air cylinders, each having an internal movable air piston, contained within a rigid cylinder, and connected to a piston rod of the cylinder. The movable piston and rigid walls of the cylinder form an internal air chamber 72 for receipt of the flow of pressurized air from the air power source 66. As pressurized air enters the internal air chamber, the air strut is urged to extend. And, conversely as pressurized air exits the internal chamber, the air strut retracts. Because the cylinder has rigid walls, it provides a substantially solid support at any extended length, and can be pressurized to hold a wide range of weights at the desired extended length. In essence, it will be understood that the air struts 22 of the exemplary embodiment of the invention have operating characteristics in which an effective spring rate of the air strut is remotely adjustable to provide a wide variety of desired operating heights, ride characteristics, and operating modes. This provides significant advantages in a trailing arm suspension system 12, according to the invention, over prior approached that used compression springs with fixed spring rates, and over prior systems that utilized air springs with flexible side walls which were limited to lower operating pressures.

As indicated in FIG. 3, the air struts 22 of the exemplary embodiment of the applicator 10 also include an integral hydraulic shock absorber 70, disposed in a linear relationship to the internal air chamber and piston arrangement 72. Other embodiments of the invention may not utilize such a shock absorber.

As will be understood from the forgoing description, the upper suspension arms 24 of the suspension systems 12 of the exemplary embodiment of the applicator 10, are rigid, and configured to not articulate vertically with respect to the frame 18. Furthermore, the forward end 52 of each of the upper suspension arms 24 is located both forward of and below the frame attachment point 48 for that upper suspension arm 24.

As illustrated in FIG. 4, a trailing-link suspension system 12, according to the invention, may further include an electronic control unit 68 that is operatively connected and configured for controlling the flow of pressurized air to the air strut 22 from the air power source 66, to thereby control extension and retraction of the air strut 22. An electronic control unit 68, according to the invention, may also be configured to receive an input signal 74 that is indicative of a desired height 16 of the frame 18 of the applicator 10 above the ground surface 16 beneath the applicator, and for controlling the air power source 66 in a manner causing the air strut 22 and suspension to support the frame 18 at the desired height 16. In the exemplary embodiment of the applicator 10, the air struts 22 in the suspension systems 12 of all four wheels 14 are controlled by one or more pressurized air sources 66, and one or more controllers 68, that may be cross linked or combined into a common air power source 66 and controller 68 for controlling the height of the frame 18.

The exemplary embodiment of the applicator 10 is operated using a method, in accordance with the invention, for controlling the height 16 of the frame 18 of the self-propelled agricultural product applicator 10 above a ground surface 20, by connecting the frame 18 to the four ground supporting wheels 14 of the applicator 12, using a trailing link suspension system 12 according to the invention at each wheel 14, and controlling a flow of pressurized air to the air struts 22 of the suspension systems 12, to thereby control extension of the air struts 22 and height 16 of the applicator frame 18 above the ground surface 20.

Figure 8:
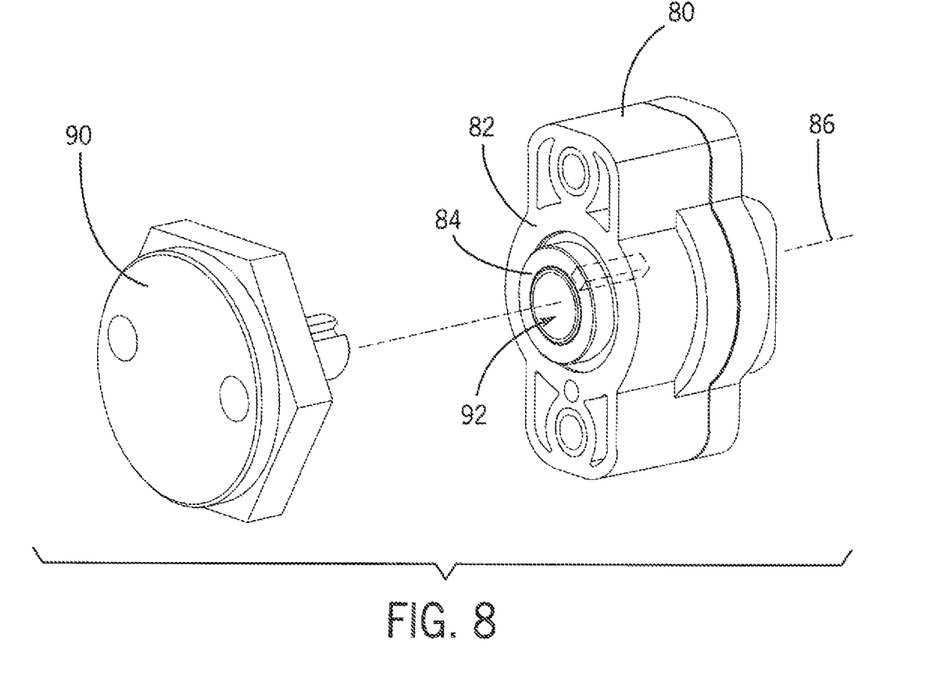
FIG. 8 is an isometric illustration of an exemplary embodiment of an angular position sensor according to the invention.

As shown in FIGS. 3, 4 and 8, the exemplary embodiment of the applicator 10 also includes angular position sensors 80 in the suspension systems 12 for all four wheels 14 of the applicator 10. In the exemplary embodiment of the applicator 10, the angular position sensors 80 are rotary position sensors, having first and second elements 82,84 thereof, in the form of a body 82 and a shaft 84 mounted within the body 82, that are rotatable relative to one another about a common axis of rotation 86. In the exemplary embodiment, the sensors 80 are each mounted with their rotational axis 86 in alignment with the suspension pivot axis 61 of the suspension system 12 for their respective wheel 14.

More specifically, the first element 82 of each sensor 80 is fixedly attached to the lower suspension arm 26 for rotation with the lower arm 26. The second element 84 is connected via a quill shaft 90 that provides a keyed, driving connection between an internal keyway 92 in the end of the second element 84 of the position sensor 80, and a second internal keyway 94 in the end of the knee pin 60. In the exemplary embodiments, the knee pins 60 are pinned to the upper suspension arms 24, and thus do not rotate relative to the upper arms 24. As a result of the keyed connection between the second elements 84 of the sensors 80 and the knee pins 60, the second elements 84 of the sensors 80 are fixedly attached to the upper suspension arms 24. By virtue of this arrangement angular rotation of the lower suspension arms 26 relative to the upper suspension arms 24 about the suspension pivot axis 61 rotates the first elements 82 of the rotary position sensors 80 relative to the second elements 84 of the sensors 80, to thereby cause the rotary position sensors 80 to detect the degree of angular rotation between the first and second suspension arms 24,26 supporting each of the wheels 14 of the applicator 10.

In the exemplary embodiment of the applicator 10, the rotary position sensors 80 are Hall-effect sensors, but it is contemplated that in other embodiments of the invention, rotary potentiometers, or other types of suitable sensors may be utilized for detecting angular position of the upper and lower suspension arms 24,26 with respect to one another.

As shown in FIG. 4, each of the angular position sensors 80 provides an electrical output signal 96 that is indicative of the present angular position of the upper and lower suspension arms 24,26, to which the sensor 80 is attached, relative to one another about the suspension pivot axis 61. The electronic control unit 68 may be operatively connected for receiving the signal 96 from one or more of the angular position sensors 80, and for controlling the flow of pressurized air to the air struts 22 from the air power source 66, to thereby control extension and retraction of the air struts 22 in response to signals 96 from one or more of the angular position sensors 80. The electronic control unit 68 may be configured to: receive the input signal 74 indicative of a desired height 16 of the frame 18 above the ground surface 20 engaged by the wheels 14; compare the desired height 74 to the current angular position of the upper and lower arms 24,26 as indicated by the signals 96 received from one or more of the position sensors 80; and control the air power source 66 in a manner causing the air struts 22 to support the frame 18 at the desired height 16 by driving the air struts 22 to an extended position whereat one or more of the angular position sensors 80 indicate that the angular position of the upper and lower arms 24,26 corresponds to the desired height 16.

It will be appreciated that the invention allows the air strut 22 of the suspension system 12 for each of the wheels 14 to be independently controlled, in response to the signal provided by the angular position sensor 80 attached to the suspension system 12 connecting that wheel 14 to the frame 18. Those skilled in the art will recognized that this degree of control has not been available in most prior approaches to providing suspension systems in agricultural product applicators, particularly in such an elegantly simple and compact manner.

It will be further appreciated that, the invention allows all the air struts 22 at all four wheels 14 of an applicator 10 to be controlled with a single position sensor 80 mounted in the suspension system 12 of one of the wheels 14, if it were deemed desirable to do so by one practicing the invention. It is also contemplated that, in some embodiments, a user of the invention might choose to practice the invention only on the front wheels, or only on the rear wheels of an applicator.

From the foregoing description, it will be apparent that the invention provides significant advantages over previous suspension systems, apparatuses and methods for high ground clearance, self-propelled, agricultural product applicators. The incorporation of the air strut and the angular position sensor into the suspension system allows the height of the applicator above the ground to be continuously controlled at a desired height, through monitoring of height by the angular position sensor, and regulation of the flow of pressurized air to the strut as the agricultural product is dispensed.

In contrast to prior systems that utilized compression springs, the struts can be actively controlled to maintain a constant height, independent of the load that the applicator may be carrying at any given moment in time. In addition, the ride height may be selected and held for a given load, in a manner that was not possible with prior suspension systems that utilized compression springs or flexible-sided air springs.

Use of the an angular position sensor in the suspension system for monitoring ride height is a far simpler solution that prior approaches that relied upon complex linkages to operate other types of sensors.

A suspension system, according to the invention, also allows for height of the applicator to be selectively adjusted for special situations, such as transporting the applicator on a trailer or truck. By controlling the air struts to retract to their lowest position (see FIG. 7) even an unloaded applicator can be made to "kneel" in a lowered position, to thereby reduce the overall height of the applicator and trailer or truck to facilitate movement of the applicator on public roadways.

Figure 9:
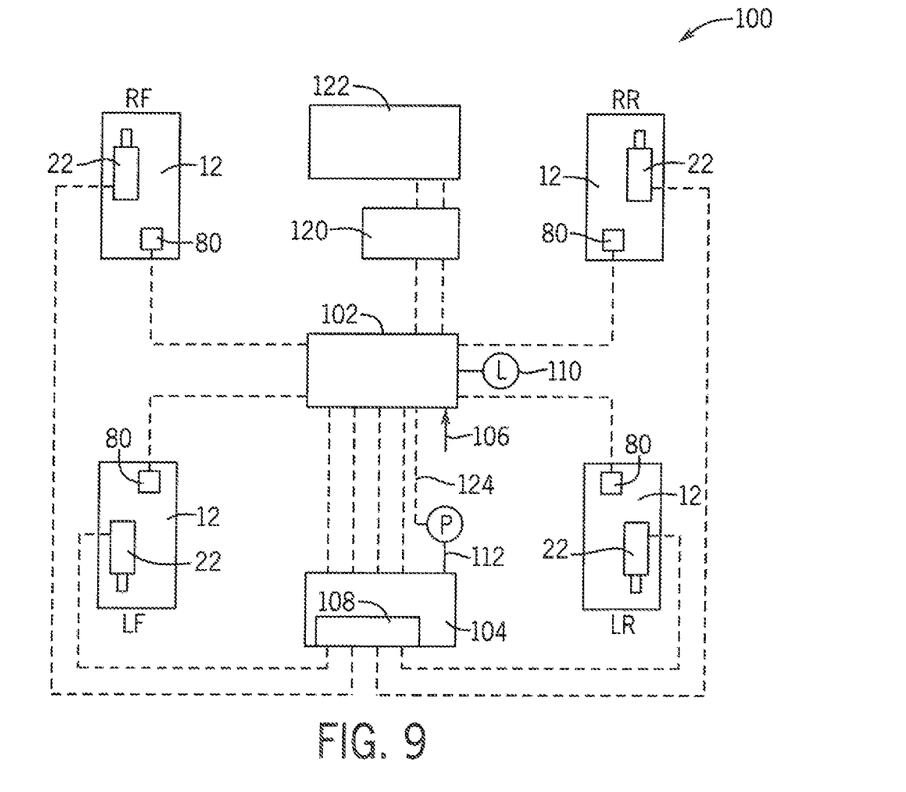
FIG. 9 is a schematic representation of a task-specific ride-height and speed control system, according to the invention, as applied in the self-propelled agricultural product applicator of FIG. 1.

As illustrated in FIG. 9, in some embodiments of the invention, various components and functionalities described above may be combined to provide a task-specific ride-height control system 100 in a self-propelled agricultural product applicator 10. The task-specific ride height control system 100 utilizes a controllable ride-height trailing arm suspension system 12, at each of the four corners LF,RF, LR,RR of the applicator 10, for independently joining each of the four wheels 14 to the frame 18 of the applicator 10. In the manner discussed in more detail above, each trailing arm suspension system 12 includes upper and lower suspension arms 24,26, an extensible air strut 22, and an angular position sensor 80 operatively interconnected to one another and disposed between the rolling axis 30 of the ground engaging wheel 14 independently supported by that suspension system 12, and a point of attachment 48 of the suspension system 12 to the frame 18, such that the position sensor 80 detects a relative angular position between the upper and lower suspension arms 24,26 at a present extension of the air strut 22.

A common electronic control unit 102 utilizes the angular positions detected by the sensors 80 at all four wheels 14, in conjunction with a desired task input 106, to control the air struts 22 of the four suspension systems 12 through a common air power source 104, in a manner substantially as described above, for automatically providing and maintaining a ride-height 16 corresponding to a desired task input 106.

In such a task-specific ride-height control system 100, according to the invention, the air power source 104 may take any appropriate form. It is contemplated, however, that an air power source 104 for use in practicing the invention might, among other things, include a solenoid operated, pressurized air supply manifold arrangement 108, that is operatively connected to and controlled by the common electronic control unit 102, for providing individually controlled flows of pressurized air to the air strut 22 of each of the suspension systems 12, to thereby control ride-height 16 by independently controlling extension of each of the air struts 22.

The desired task input 106 indicates a specific desired task, selected by the operator of the applicator 10 from a predetermined list acme or more predetermined desired tasks, and the electronic control unit 102 is internally configured to automatically control the air struts 22 at an extension thereof providing a ride-height 16 corresponding to the desired task input 106 selected by the operator. In various forms of the invention, the one or more predetermined desired tasks may include a product application task corresponding to a standard ride-height for APPLICATION of the agricultural product, as illustrated in FIG. 6, for applying the agricultural product, and at least one additional desired task input 106 corresponding to an additional ride height 16 that is different from the standard ride-height 16, (as illustrated in FIG. 6), used for applying the agricultural product.

In various forms of the invention, the at least one additional desired task input 106 and its corresponding ride-height 16 may be selected from the group of desired task inputs 106 and corresponding ride-heights 16 including: TENDERING, at a maximum ride-height 16 of the applicator 10, as shown in FIG. 5; TRANSPORT, at a minimum ride-height 16 of the applicator 10, as shown in FIG. 7; SERVICING, at a selected servicing ride-height 16 of the applicator 10 in the range of ride-heights between the maximum and minimum heights shown in FIGS. 5 and 7 respectively; TRANSIT, at a selected servicing ride-height 16 of the applicator 10 in the range of ride-heights between the maximum and minimum heights shown in FIGS. 5 and 7 respectively; and PARKED, wherein the air struts 22 of the suspension systems 12 are locked against movement at a present ride-height, i.e. at whatever ride-height 16 the applicator 10 was operating at when the operator of the applicator 10 entered the PARKED desired task mode.

As further illustrated in FIG. 9, some forms of a task-specific ride-height control system 100, according to the invention, may further include a load sensing arrangement 110 for detecting a weight of the applicator 10 and/or the agricultural product in the product container 38, and the common electronic control unit 102 may be further configured to modify one or more of the desired task inputs 106 in accordance with a predetermined protocol corresponding to the detected weight. For example, the electronic control unit 106 may be configured to provide a different standard APPLICATION ride height when the applicator 10 is configured for applying a dry product than when the applicator 10 is configured for applying a liquid product. It is contemplated that a load sensing arrangement 108 utilized in practicing the invention may take any appropriate form, and include components such as a load cell (not shown), or an air pressure sensor 112 in the air power source 104.

In practicing the invention with some form of load sensing arrangement 110 or 112, it is contemplated that the common electronic control unit 102 may be configured to utilize inputs from the load sensing arrangement 110 or 112, in combination with signals from the angular position sensors 80 at the four corners LF,RF,LR,RR of the applicator 10, for carrying out the configured protocols that the electronic control unit 102 utilizes for controlling ride-height 16 at one or more of the desired task-specific ride heights provided in the configuration of the task-specific ride-height control system 100.

Those having skill in the art will readily appreciate that through practice of a task-specific ride-height control system 100, according to the invention, operating ease and functionality of the applicator 10 is substantially enhanced. By automating control of ride-height 16 as a function of a desired task input 106, the operator is freed from manual manipulation of ride-height to concentrate more fully on driving the applicator 10 in a manner resulting in optimal application efficiency and effectiveness. It will also be appreciated that practice of the invention in its various forms provides substantially greater freedom for automated task-specific ride height control than could be achieved in prior approaches to providing suspension systems in self-propelled agricultural product applicators.

As further shown schematically in FIG. 9, the task-specific ride-height control system 100 includes a speed control arrangement 120, that is operatively connected between a propulsion unit 122 of the applicator 10 and the common electronic control unit 102, to thereby convert the task-specific ride-height control system described above into a task-specific ride-height and speed control system 100. The term "propulsion unit" is used herein to include an engine, and other powertrain or drive units, such as the hydraulic system powering the individual drive motors 50 powering each of the four wheels 14 of the applicator 10. The term "speed control arrangement," as used herein, is intended to include any component, or arrangement of components, including controllable governors, hydraulic flow control valves, etc., as applicable to regulating the ground speed of the applicator 10 by controlling the particular form of propulsion unit 122 in a vehicle in which the invention is practiced.

As will be described in more detail below, in the task-specific ride-height and speed control system 100, the common electronic control unit 102 continues to utilize the angular positions detected by the sensors, in conjunction with the desired task input 106, to control the air struts 22 in a manner providing a ride-height 16 corresponding to the desired task input 106, in the manner described above. With the addition of task-specific speed control functionality, however, the electronic control unit 102 also controls maximum speed of the applicator 10 for each task, per a predetermined schedule, or, in some films of the invention, in response to a suspended load of the applicator 10.

The speed control arrangement 120 is operatively connected to the propulsion unit 122 for controlling ground speed of the applicator 10. And, the electronic control unit 100 is operatively connected to the angular position sensors 80, the load sensing arrangement 110 or 112, the air power source 104, and the speed control arrangement 120. In the exemplary embodiment of the applicator 10, the load sensing arrangement utilizes an air pressure sensor 112 that is positioned within the air circuit supplying the flow of pressurized air to the struts 22, in such a manner that the pressure of the flow of pressurized air being supplied to the air struts 22 is utilized to determine the weight being supported by the suspension systems 12 of the applicator 10.

As described above, the electronic control unit 102 of the task-specific ride-height and speed control system 100 is configured for receiving a desired task input 106, and signals 96 from the angular position sensors 80 that are indicative of a present relative angular position of the upper and lower suspension arms 24,26 of each suspension system 12. The control unit 102 is also configured for commanding the air power source 104 to control the air struts 22 at an extension of the struts 22 that provides a ride-height 16 corresponding to the desired task input 106. The electronic control unit 102 is further configured for determining a maximum ground speed corresponding to the desired task input 106, and commanding the speed control arrangement 120 to limit ground speeds, while the applicator 10 is operating at the ride-height 16 corresponding to the desired task input 106, to ground speeds that are less than or equal to the maximum ground speed corresponding to the desired task input 106.

With the task-specific ride-height speed control system 100, the desired task input 106 indicates a desired task, selected by an operator of the applicator 10, or automatically by the electronic control unit 102 based on operator inputs to control elements of the applicator 10, from one or more predetermined possible desired tasks, and the electronic control unit 102 is configured to control the air struts 22 at an extension thereof providing a ride-height corresponding to the selected desired task input 106.

The load sensing arrangement 120 is operatively connected to the electronic control unit 102 for detecting a suspended weight of the applicator 10, including any agricultural product in the product container 38, the weight of the product container and any product distribution apparatus, such as the sprayer bar 39 shown in FIG. 1, and for sending a signal indicative of the detected suspended weight to the electronic control unit 102. The term "suspended weight" is intended to include all weight supported by the suspension systems 12 of the applicator 10. This weight, generally speaking, includes the weight of everything carried by the frame 12 of the applicator, as supported by the suspension systems 12. In forms of the invention having a load sensing arrangement 120, the electronic control unit 102 is further configured to modify the determined maximum ground speed in accordance with a predetermined schedule of maximum ground speeds, as a function of the desired task input 106, ride-height 16, and the determined suspended weight.

The electronic control unit 102, in the task-specific ride height speed control system 100 of the applicator 10, is yet further configured to compare the present ride-height signals 96 from the angular position sensors 80 to the detected suspended weight provided by the air pressure sensor 112, and to command the speed control arrangement 120 to further limit the propulsion unit 122 to operation at speeds at or under a predetermined default SUSPENSION FAULT speed if the detected suspended weight and any one or more of the present ride-height signals 96 is not consistent with a ride-height 16 corresponding to the desired task input 106.

The electronic controller in a task-specific ride-height and speed control system 100, according to the invention, provides essentially unlimited ability to control the relationship between ride-height and operating speed while performing a wide array of desired tasks, in a manner that optimizes performance, ease of use and operational safety of the applicator 10. For example, the electronic control unit 102 of the applicator 10 may be configured to control the speed of the propulsion unit 122 in accordance with at least one of the predetermined combinations of desired task input 106, ride-height 16, determined suspended weight and maximum ground speed, from the group of predetermined combinations consisting of: (1) the desired task input 106 is TRANSIT, present ride-height 16 is as commanded for TRANSIT operation, detected suspended weight indicates that an unloaded product container 38 and distributor 39 are mounted on the frame 18, and a commanded maximum TRANSIT ground speed of the applicator 10; (2) the desired task input 106 is TRANSIT, present ride-height 16 is as commanded for TRANSIT operation, detected suspended weight indicates that no product container 38 and distributor 39 are mounted on the frame 18, and a commanded maximum bare-frame ground speed of the applicator 10 that is lower than the maximum TRANSIT ground speed; (3) the desired task input 106 is APPLICATION, present ride-height 1 is as commanded for APPLICATION operation, detected suspended weight indicates that a product container 38 and distributor 39 are mounted on the frame 18 and carrying a load of product within load limits of the applicator 10, and a commanded maximum APPLICATION ground speed of the applicator; (4) the desired task input 106 is APPLICATION, present ride-height 16 is as commanded for APPLICATION operation, detected suspended weight indicates that a product container 38 and distributor 39 are mounted on the frame 18 and carrying a load of product that exceeds load limits of the applicator 10, and a commanded maximum OVERLOADED ground speed of the applicator: and, (5) the desired task input 106 is TENDERING, present ride-height 16 is as commanded for TENDERING operation, detected suspended weight indicates that a product container 38 and distributor 39 are mounted on the frame 18 and carrying a load of product within load limits of the applicator 10, and a commanded maximum TENDERING ground speed of the applicator 10.

As specific examples, under the conditions of (1) above, the electronic control unit 102 might command the speed control unit 122 to limit maximum TRANSIT operating speeds to the range of 0 to 40 miles per hour. Tinder the conditions of (2) above, the electronic control unit 102 might command the speed control unit 122 to limit maximum TRANSIT operating speeds to the range of 0 to 8 miles per hour. Under the conditions of (3) above, the electronic control unit 102 might command the speed control unit 122 to limit maximum APPLICATION operating speeds to the range of 0 to 25 miles per hour. Under the conditions of (4) above, the electronic control unit 102 might command the speed control unit 122 to limit maximum OVERLOADED operating speeds to the range of 0 to 8 miles per hour. And, under the conditions of (5) above, the electronic control unit 102 might command the speed control unit 122 to limit maximum TENDERING operating speeds to the range of 0 to 25 miles per hour.

In the task-specific ride-height and speed control system 100 of the applicator 10, the electronic control unit 102 is configured to receive a suspended weight signal 124 from the load sensor arrangement 112 and recalculate the maximum ground speed whenever the desired task input 106 is changed. The electronic control unit 102 of the applicator 10 is also configured to command a change in maximum speed, from a previously commanded maximum ground speed to the recalculated maximum ground speed, only after the applicator 10 has first been brought to a complete stop.

The invention may also take the form of a method for providing task-specific ride-height-and speed control for a self-propelled agricultural product applicator having a propulsion unit and three or more ground engaging wheels operatively joined to a frame adapted for supporting at least one agricultural product container and distributor arrangement and defining forward and rear ends of the frame, a longitudinally extending central axis of the frame extending from the rear to the front of the frame in a direction of travel of the applicator, and a vertical axis of the frame.

A method for providing task-specific ride-height and speed control in the applicator 10 includes the steps of: (1) independently joining each wheel 14 to the frame 18 with a controllable ride-height trailing arm suspension system 12, with each trailing arm suspension system 12 including an upper suspension arm 24, a lower suspension arm 26, an extensible air strut 22 and an angular position sensor 80 operatively interconnected to one another and disposed between a rolling axis 30 the ground engaging wheel 14 independently supported by that suspension system 12 and a point of attachment 48 of the suspension system 12 to the frame 18, in such a manner that the angular position sensor 80 detects a relative angular position between the upper and lower suspension arms 24,26 at a present extension of the air strut 22; (2) providing a controlled flow of pressurized air from an air power source 104 to the air strut 22 of each of the suspension systems 12, to thereby control ride-height 16 by controlling extension of each of the air struts 22; (3) providing a speed control arrangement 120 operatively connected to the propulsion unit 122 for controlling ground speed of the applicator 10; (4) operatively connecting an electronic control unit 102 to the angular position sensors 80, the air power source 104 and the speed control arrangement 120; (5) receiving, a desired task input 106 and signals 96 from the angular position sensors 80, at the electronic control unit 102, the signals 96 from the angular position sensors 80 being indicative of a present relative angular position of the upper and lower suspension arms 24,26 of each suspension system 12; (6) utilizing the electronic control unit 102 for commanding the air power source 104 to control the air struts 22 at an extension thereof providing a ride-height 16 corresponding to the desired task input 106; and, (7) utilizing the electronic control unit 102 for determining a maximum ground speed corresponding to the desired task input 106, and commanding the speed control arrangement 122 to limit ground speeds while operating at the ride-height 16 corresponding to the desired task input 106 to ground speeds less than or equal to the maximum ground speed corresponding to the desired task input 106.

A method for operating the task-specific ride-height and speed control 100 of the applicator 10 also includes, operatively connecting a load sensor arrangement 110 or 112 to the electronic control unit 102 for detecting a suspended weight of the applicator and agricultural product in the product container, and for sending a signal 124 indicative of the detected suspended weight to the electronic control unit 102, and using the electronic control unit 102 to modify the determined maximum ground speed in accordance with a predetermined schedule of maximum ground speeds as a function of the desired task input 106, ride-height 16, and the detected suspended weight. The method further includes, performing the step of receiving a suspended weight signal 124 from the load sensor arrangement 110 or 112 and recalculating the maximum ground speed whenever the desired task input 106 is changed. The method for operating the task-specific ride-height and speed control 100 of the applicator 10 further includes, performing the step of commanding a change in maximum speed, from a previously commanded maximum speed to the recalculated maximum ground speed, only after the applicator 10 has first been brought to a complete stop.

Those having skill in the art will readily appreciate that through practice of a task-specific ride-height and speed control system 100, according to the invention, operating ease and functionality of the applicator 10 is even more substantially enhanced. By automating speed control and ride-height 16 as a function of a desired task input 106, the operator is freed from manual manipulation of ride-height, and keeping maximum speed within desirable limits for a given task, to concentrate more fully on driving the applicator 10 in a manner resulting in optimal application efficiency and effectiveness. It will also be appreciated that practice of the invention in its various forms provides substantially greater freedom for automated task-specific ride-height and speed control than could be achieved in prior approaches to providing suspension systems in self-propelled agricultural product applicators.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. It is anticipated that skilled artisans may employ such variations as appropriate, and further anticipated that the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A task-specific ride-height and speed control system for a self-propelled agricultural product applicator having a propulsion unit and three or more ground engaging wheels operatively joined to a frame adapted for supporting at least one agricultural product container and distributor arrangement, and defining forward and rear ends of the frame, a longitudinally extending central axis of the frame extending from the rear end to the forward end of the frame in a direction of travel of the self-propelled agricultural product applicator, and a vertical axis of the frame, the task-specific ride-height system comprising:

a plurality of controllable ride-height trailing arm suspension systems independently joining each wheel to the frame, with each trailing arm suspension system including an upper suspension arm, a lower suspension arm, an extensible air strut and an angular position sensor operatively interconnected to one another and disposed between a rolling axis of a corresponding ground engaging wheel of the three or more ground engaging wheels independently supported by that controllable ride-height trailing arm suspension system and a point of attachment of the controllable ride-height trailing arm suspension system to the frame such that the angular position sensor detects a relative angular position between the upper and lower suspension arms at a present extension of the extensible air strut;

an air power source for providing a controlled flow of pressurized air to the extensible air strut of each of the controllable ride-height trailing arm suspension systems, to thereby control ride-height by controlling extension of each of the extensible air struts;

a speed control arrangement operatively connected to the propulsion unit for controlling ground speed of the self-propelled agricultural product applicator; and an electronic control unit operatively connected to the angular position sensors, a load sensing arrangement, the air power source, and the speed control arrangement;

the electronic control unit being configured for receiving a desired task input and signals from the angular position sensors indicative of a present relative angular position of the upper and lower suspension arms of each suspension system, and commanding the air power source to control the extensible air struts at an extension thereof providing a ride-height corresponding to the desired task input;

the electronic control unit also being configured for determining a maximum ground speed corresponding to the desired task input, and commanding the speed control arrangement to limit ground speeds while operating at the ride-height corresponding to the desired task input to ground speeds less than or equal to the maximum ground speed corresponding to the desired task input.

2. The task-specific ride-height and speed control system of claim 1, wherein the desired task input indicates a selected desired task of one or more predetermined desired tasks, and the electronic control unit is configured to control the extensible air struts at an extension thereof providing a preset ride-height corresponding to the selected desired task input.

3. The task-specific ride-height and speed control system of claim 2, wherein the load sensing arrangement is operatively connected to the electronic control unit for detecting a suspended weight of the self-propelled agricultural product applicator and agricultural product in the product container, and for sending a signal indicative of the detected suspended weight to the electronic control unit, and wherein the electronic control unit is further configured to modify the determined maximum ground speed in accordance with a predetermined schedule of maximum ground speeds as a function of the desired task input, the preset ride-height, and the detected suspended weight.

4. The task-specific ride-height and speed control system of claim 3, wherein the load sensing arrangement includes a pressure sensor operatively connected to detect a pressure of the flow of air provided by the air power source to the extensible air struts, as being indicative of the detected suspended weight of the self-propelled agricultural product applicator and product container and distributor.

5. The task-specific ride-height and speed control system of claim 3, wherein the electronic control unit is yet further configured to compare the present ride-height signals from the angular position sensors to the detected suspended weight, and command the speed control arrangement to further limit the propulsion unit to operation at speeds at or under a predetermined default speed if the detected suspended weight and any one or more of the present ride-height signals is not consistent with the preset ride-height corresponding to the desired task input.

6. The task-specific ride-height and speed control system of claim 3, wherein the electronic controller is configured to control the ground speed of the self-propelled agricultural product applicator in accordance with at least one of the predetermined combinations of desired task input, preset ride-height, determined suspended weight and maximum ground speed from the group of predetermined combinations consisting of:

desired task input is transit, present ride-height is as commanded for transit operation, detected suspended weight indicates that an unloaded product container and distributor are mounted on the frame, and a commanded maximum transit ground speed of the self-propelled agricultural product applicator;

desired task input is transit, present ride-height is as commanded for transit operation, detected suspended weight indicates that no product container and distributor are mounted on the frame, and a commanded maximum bare frame ground speed of the self-propelled agricultural product applicator that is lower than the commanded maximum transit ground speed;

desired task input is application, present ride-height is as commanded for application operation, detected suspended weight indicates that a product container and distributor are mounted on the frame and carrying a load of product within load limits of the applicator, and a commanded maximum application ground speed of the self-propelled agricultural product applicator;

desired task input is application, present ride-height is as commanded for application operation, detected suspended weight indicates that a product container and distributor are mounted on the frame and carrying a load of product that exceeds load limits of the self-propelled agricultural product applicator, and a commanded maximum overloaded ground speed of the self-propelled agricultural product applicator; and desired task input is tendering, present ride-height is as commanded for tendering operation, detected suspended weight indicates that a product container and distributor are mounted on the frame and carrying a load of product within load limits of the applicator, and a commanded maximum tendering ground speed of the applicator.

7. The task-specific ride-height and speed control system of claim 3, wherein the electronic control unit is configured to receive a suspended weight signal from the load sensor arrangement and recalculate the maximum ground speed whenever the desired task input is changed.

8. The task-specific ride-height and speed control system of claim 7, wherein the electronic control unit is configured to command a change in maximum speed, from a previously commanded maximum ground speed to the recalculated maximum ground speed, only after the self-propelled agricultural product applicator has first been brought to a complete stop.

9. A self-propelled agricultural product applicator having a propulsion unit and three or more ground engaging wheels operatively joined to a frame adapted for supporting at least one agricultural product container and distributor arrangement, with the frame being adapted for supporting at least one agricultural product container and defining forward and rear ends of the frame, a longitudinally extending central axis of the frame extending from the rear end to the forward end of the frame in a direction of travel of the self-propelled agricultural product applicator, and a vertical axis of the frame, the wheels each being joined to the frame by a task-specific ride-height and speed control system comprising:

a plurality of controllable ride-height trailing arm suspension systems independently joining each wheel to the frame, with each trailing arm suspension system including an upper suspension arm, a lower suspension arm, an extensible air strut and an angular position sensor operatively interconnected to one another and disposed between a rolling axis of a corresponding ground engaging wheel of the three or more ground engaging wheels independently supported by that controllable ride-height trailing arm suspension system and a point of attachment of the controllable ride-height trailing arm suspension system to the frame such that the angular position sensor detects a relative angular position between the upper and lower suspension arms at a present extension of the extensible air strut;

an air power source for providing a controlled flow of pressurized air to the extensible air strut of each of the controllable ride-height trailing arm suspension systems, to thereby control ride-height by controlling extension of each of the extensible air struts;

a speed control arrangement operatively connected to the propulsion unit for controlling ground speed of the self-propelled agricultural product applicator; and an electronic control unit operatively connected to the angular position sensors, a load sensing arrangement, the air power source, and the speed control arrangement;

the electronic control unit being configured for receiving a desired task input and signals from the angular position sensors indicative of a present relative angular position of the upper and lower suspension arms of each suspension system, and commanding the air power source to control the extensible air struts at an extension thereof providing a ride-height corresponding to the desired task input;

the electronic control unit also being configured for determining a maximum ground speed corresponding to the desired task input, and commanding the speed control arrangement to limit ground speeds while operating at the ride-height corresponding to the desired task input to ground speeds less than or equal to the maximum ground speed corresponding to the desired task input.

10. The applicator of claim 9, wherein the desired task input indicates a selected desired task of one or more predetermined desired tasks, and the electronic control unit is configured to control the extensible air struts at an extension thereof providing a ride-height corresponding to the selected desired task input.

11. The applicator of claim 9, wherein the load sensing arrangement is operatively connected to the electronic control unit for detecting a suspended weight of the self-propelled agricultural product applicator and agricultural product in the product container, and for sending a signal indicative of the detected suspended weight to the electronic control unit, and wherein the electronic control unit is further configured to modify the determined maximum ground speed in accordance with a predetermined schedule of maximum ground speeds as a function of the desired task input, the ride-height, and the detected suspended weight.

12. The applicator of claim 11, wherein the load sensing arrangement of the task-specific ride-height and speed control system includes a pressure sensor operatively connected to detect a pressure of the flow of air provided by the air power source to the extensible air struts, as being indicative of the detected suspended weight of the self-propelled agricultural product applicator and product container and distributor.

13. The applicator of claim 11, wherein the electronic control unit of the task-specific ride-height and speed control system is further configured to compare the present ride-height signals from the angular position sensors to the detected suspended weight, and command the speed control arrangement to further limit the propulsion unit to operation at speeds at or under a predetermined default speed if the detected suspended weight and any one or more of the present ride-height signals is not consistent with a ride-height corresponding to the desired task input.

14. The applicator of claim 11, wherein the electronic controller of the task-specific ride-height and speed control system is configured to control the speed of the propulsion unit in accordance with at least one of the predetermined combinations of desired task input, the ride-height, the detected suspended weight and maximum ground speed from the group of predetermined combinations consisting of:

desired task input is transit, present ride-height is as commanded for transit operation, detected suspended weight indicates that an unloaded product container and distributor are mounted on the frame, and a commanded maximum transit ground speed of the applicator;

desired task input is transit, present ride-height is as commanded for transit operation, detected suspended weight indicates that no product container and distributor are mounted on the frame, and a commanded maximum bare frame ground speed of the self-propelled agricultural product applicator that is lower than the commanded maximum transit ground speed;

desired task input is application, present ride-height is as commanded for application operation, detected suspended weight indicates that a product container and distributor are mounted on the frame and carrying a load of product within load limits of the applicator, and a commanded maximum application ground speed of the applicator;

desired task input is application, present ride-height is as commanded for application operation, detected suspended weight indicates that a product container and distributor are mounted on the frame and carrying a load of product that exceeds load limits of the applicator, and a commanded maximum overloaded ground speed of the self-propelled agricultural product applicator; and desired task input is tendering, present ride-height is as commanded for tendering operation, detected suspended weight indicates that a product container and distributor are mounted on the frame and carrying a load of product within load limits of the applicator, and a commanded maximum tendering ground speed of the self-propelled agricultural product applicator.

15. The applicator of claim 11, wherein the electronic control unit of the task-specific ride-height and speed control system is configured to receive a suspended weight signal from the load sensor arrangement and recalculate the maximum ground speed whenever the desired task input is changed.

16. The applicator of claim 15, wherein the electronic control unit of the task-specific ride-height and speed control system is configured to command a change in maximum speed, from a previously commanded maximum ground speed to the recalculated maximum ground speed, only after the self-propelled agricultural product applicator has first been brought to a complete stop.

17. A method for providing task-specific ride-height and speed control for self-propelled agricultural product applicator having a propulsion unit and three or more ground engaging wheels operatively joined to a frame adapted for supporting at least one agricultural product container and distributor arrangement and defining forward and rear ends of the frame, a longitudinally extending central axis of the frame extending from the rear end to the forward end of the frame in a direction of travel of the self-propelled agricultural product applicator, and a vertical axis of the frame, the method for providing task-specific ride-height control comprising:

independently joining each wheel to the frame with a plurality of controllable ride-height trailing arm suspension systems, with each trailing arm suspension system including an upper suspension arm, a lower suspension arm, an extensible air strut and an angular position sensor operatively interconnected to one another and disposed between a rolling axis the ground engaging wheel independently supported by that suspension system and a point of attachment of the suspension system to the frame such that the angular position sensor detects a relative angular position between the upper and lower suspension arms at a present extension of the extensible air strut;

providing a controlled flow of pressurized air from an air power source to the extensible air strut of each of the suspension systems, to thereby control ride-height by controlling extension of each of the extensible air struts;

providing a speed control arrangement operatively connected to the propulsion unit for controlling ground speed of the self-propelled agricultural product applicator;

operatively connecting an electronic control unit to the angular position sensors, the air power source and the speed control arrangement;

receiving, a desired task input and signals from the angular position sensors, at the electronic control unit, the signals from the angular position sensor being indicative of a present relative angular position of the upper and lower suspension arms of each trailing arm suspension system;

utilizing the electronic control unit for commanding the air power source to control the extensible air struts at an extension thereof providing a ride-height corresponding to the desired task input; and utilizing the electronic control unit for determining a maximum ground speed corresponding to the desired task input, and commanding the speed control arrangement to limit ground speeds while operating at the ride-height corresponding to the desired task input to ground speeds less than or equal to the maximum ground speed corresponding to the desired task input.

18. The method of claim 17, further including operatively connecting a load to the electronic control unit for detecting a suspended weight of the self-propelled agricultural product applicator and agricultural product in the product container, and for sending a signal indicative of the detected suspended weight to the electronic control unit, and using the electronic control unit to modify the determined maximum ground speed in accordance with a predetermined schedule of maximum ground speeds as a function of the desired task input, ride-height, and the detected suspended weight.

19. The method of claim 17, further including performing the step of receiving a suspended weight signal from the load sensor arrangement and recalculating the maximum ground speed whenever the desired task input is changed.

20. The method of claim 19, further including performing the step of commanding a change in maximum speed, from a previously commanded maximum ground speed to the recalculated maximum ground speed, only after the self-propelled agricultural product applicator has first been brought to a complete stop.

* * * * *